(12) United States Patent
Alameh et al.

(10) Patent No.: US 9,140,794 B2
(45) Date of Patent: Sep. 22, 2015

(54) ELECTRONIC DEVICE AND METHOD FOR DETECTING PRESENCE

(71) Applicant: Motorola Mobility LLC, Libertyville, IL (US)

(72) Inventors: Rachid Mohsen Alameh, Crystal Lake, IL (US); Patrick J. Cauwels, South Beloit, IL (US); Jun Jiang, Lake Zurich, IL (US); Kenneth A. Paitl, West Dundee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/103,922

(22) Filed: Dec. 12, 2013

(65) Prior Publication Data

US 2015/0069243 A1     Mar. 12, 2015

Related U.S. Application Data

(60) Provisional application No. 61/876,691, filed on Sep. 11, 2013.

(51) Int. Cl.
| | |
|---|---|
| *G01J 5/34* | (2006.01) |
| *G01S 17/50* | (2006.01) |
| *G01J 1/04* | (2006.01) |
| *G01J 5/26* | (2006.01) |
| *G01S 17/02* | (2006.01) |
| *G01J 1/42* | (2006.01) |

(Continued)

(52) U.S. Cl.
CPC ............... *G01S 17/50* (2013.01); *G01J 1/0407* (2013.01); *G01J 1/42* (2013.01); *G01J 5/0025* (2013.01); *G01J 5/0818* (2013.01); *G01J 5/12* (2013.01); *G01J 5/26* (2013.01); *G01J 5/34* (2013.01); *G01S 17/026* (2013.01); *H04M 1/026* (2013.01); *G01V 8/10* (2013.01)

(58) Field of Classification Search
CPC ........................................................ G01J 5/34
USPC ....................................................... 250/338.3
See application file for complete search history.

(56) References Cited

U.S. PATENT DOCUMENTS

| | | |
|---|---|---|
| 4,769,697 A | 9/1988 | Gilley et al. |
| 4,930,236 A | 6/1990 | Hart |

(Continued)

FOREIGN PATENT DOCUMENTS

| | | |
|---|---|---|
| EP | 2515526 A2 | 4/2012 |
| WO | 2013060859 A1 | 5/2013 |

OTHER PUBLICATIONS

U.S. Appl. No. 14/098,870, by Alameh, et al., filed Dec. 6, 2013.

(Continued)

*Primary Examiner* — David Porta
*Assistant Examiner* — Hugh H Maupin
(74) *Attorney, Agent, or Firm* — Shumaker & Sieffert, P.A.

(57) ABSTRACT

An electronic device for detecting presence includes a housing and an infrared ("IR") sensor. The housing includes an outer surface having an opening formed thereon. The IR sensor is disposed in the housing and adjacent to the opening. The IR sensor has an unobstructed path and line of sight through the opening to outside of the housing. The IR sensor is configured to receive heat emitted by a person from outside of the housing via the opening and to generate a signal in response thereto.

24 Claims, 7 Drawing Sheets

(51) Int. Cl.
*G01J 5/00* (2006.01)
*H04M 1/02* (2006.01)
*G01J 5/12* (2006.01)
*G01J 5/08* (2006.01)
*G01V 8/10* (2006.01)

(56) References Cited

U.S. PATENT DOCUMENTS

| | | | |
|---|---|---|---|
| 5,111,115 | A | 5/1992 | Ball et al. |
| 5,368,038 | A | 11/1994 | Fraden |
| 5,694,498 | A | 12/1997 | Manasson et al. |
| 5,933,082 | A | 8/1999 | Abita et al. |
| 6,956,564 | B1 * | 10/2005 | Williams ............... 345/179 |
| 8,344,325 | B2 | 1/2013 | Merrell et al. |
| 8,643,628 | B1 | 2/2014 | Eriksson et al. |
| RE44,855 | E * | 4/2014 | Williams ............... 345/179 |
| 2003/0132974 | A1 | 7/2003 | Bodin |
| 2004/0013377 | A1 | 1/2004 | Han |
| 2004/0020699 | A1 | 2/2004 | Zalila et al. |
| 2005/0288591 | A1 | 12/2005 | Kondoh et al. |
| 2006/0069478 | A1 | 3/2006 | Iwama |
| 2007/0137462 | A1 | 6/2007 | Barros et al. |
| 2008/0106527 | A1 | 5/2008 | Cornish et al. |
| 2008/0219672 | A1 * | 9/2008 | Tam et al. ............... 398/130 |
| 2008/0220831 | A1 | 9/2008 | Alameh et al. |
| 2009/0028674 | A1 | 1/2009 | Woo et al. |
| 2009/0146840 | A1 | 6/2009 | Hess et al. |
| 2010/0049401 | A1 | 2/2010 | Watanabe et al. |
| 2011/0128140 | A1 | 6/2011 | Pampus et al. |
| 2011/0179368 | A1 | 7/2011 | King et al. |
| 2011/0248152 | A1 | 10/2011 | Svajda et al. |
| 2012/0062743 | A1 | 3/2012 | Lynam et al. |
| 2012/0128025 | A1 | 5/2012 | Huppi et al. |
| 2013/0135472 | A1 | 5/2013 | Wu et al. |
| 2013/0214166 | A1 | 8/2013 | Barlow et al. |

OTHER PUBLICATIONS

U.S. Appl. No. 14/103,909, by Alameh, et al., filed Dec. 12, 2013.
U.S. Appl. No. 14/103,902, by Alameh, et al., filed Dec. 12, 2013.
Lego Mindstorms NXT PIR Sensor from HiTechnic, Lego Mindstorms, retrieved on Apr. 2, 2014 from www.generationrobots.com/en/401150-lego-mindstorms-nxt-pir-sensor-hitechnic.html, 3 pp.
Office Action from U.S. Appl. No. 14/103,909, Dated Apr. 24, 2015, 14 pp.

* cited by examiner

ELECTRONIC DEVICE AND METHOD FOR DETECTING PRESENCE

CROSS-REFERENCES TO RELATED APPLICATIONS

The present application claims the benefit of the filing date of U.S. Provisional Application No. 61/976,691, filed Sep. 11, 2013, the entire contents of which are incorporated by reference.

TECHNICAL FIELD

The present disclosure relates to electronic devices and methods for detecting presence, more particularly, to electronic devices and methods for detecting presence using an infrared sensor.

BACKGROUND

Mobile devices such as cellular telephones, smart phones, and other handheld or portable electronic devices such as personal digital assistants ("PDAs"), headsets, MP3 players, etc. have become popular and ubiquitous. As more and more features have been added to mobile devices, there has been an increasing desire to equip these mobile devices with input/output mechanisms that accommodate numerous user commands and/or react to numerous user behaviors. It is of increasing interest that mobile devices be capable of detecting the presence of, and determining with some accuracy the position of, physical objects located outside of the mobile devices and, more particularly, the presence and location of human beings (or portions of their bodies, such as their heads or hands) who are using the mobile devices or otherwise are located nearby the mobile devices. By virtue of such capabilities, the mobile devices are able to adjust their behavior in a variety of manners that are appropriate given the presence (or absence) and location of the human beings and/or other physical objects.

While remote sensing devices such as infrared (or, more accurately, near-infrared) transceivers have been employed in the past in some mobile devices to allow for the detection of the presence and/or location of human beings and/or physical objects even based on their movement, such sensing devices have been limited in various respects. In particular, some such near-infrared transceivers in some such mobile devices are only able to detect the movement of a human being/physical object within a certain distance from the given transceiver, but not able to detect the continuous presence of the human being/physical object after the human being/physical object stops moving or vice versa. Also, some such transceivers in some such mobile devices are undesirably complicated, require large numbers of components in order to operate, or require optical elements that attenuate the received infrared signals, which in turn renders such devices unduly expensive and inefficient.

DRAWINGS

While the appended claims set forth the features of the present techniques with particularity, these techniques may be best understood from the following detailed description taken in conjunction with the accompanying drawings of which:

DESCRIPTION

The present disclosure sets forth an electronic device for detecting presence using an infrared ("IR") sensor. The IR sensor is disposed below the speaker opening to avoid attenuation of IR signals a top surface of the housing (e.g., cover glass). In an embodiment, when the IR sensor detects the presence of a person, who may be near the device (e.g., looking down at device), the device may carry out various functions. In another embodiment, this IR sensor configuration may be used to perform the IR proximity function, where the device deactivates a touch screen of the device when a person is very close to the device (e.g., the person is on a call).

In an embodiment, an electronic device includes a housing and an infrared ("IR") sensor. The housing includes an outer surface having an opening formed thereon. The IR sensor is disposed in the housing and adjacent to the opening. The IR sensor has an unobstructed path and line of sight through the opening to outside of the housing. The IR sensor is configured to receive heat emitted by a person from outside of the housing via the opening and generate a signal in response thereto.

The IR sensor may be a thermopile sensor or a pyroelectric sensor. In an embodiment, the IR sensor may be a thermopile sensor configured to detect emitted heat having a wavelength that ranges between about 5 to 100 micrometers.

In another embodiment, the IR sensor may be a sensor of adjustable electrical gain and the device may further include an accelerometer configured to detect motion of the device. If the accelerometer detects that the device is moving, the device adjust the gain of the IR sensor to a low electrical gain. If the accelerometer detects that the device is stationary, the device adjusts the gain of the IR sensor to a high electrical gain. When the IR sensor has low electrical gain, it is used to perform the IR proximity function. When the IR sensor has high electrical gain, it is used to detect presence of a person.

The electronic device may further include a mesh material covering the opening, and the mesh material may have one or more openings that are at least partially aligned with the opening of the outer surface of the housing.

The electronic device may further include an accelerometer configured to detect motion of the device. If the accelerometer detects that the device is moving, the device deactivates the first IR sensor. If the accelerometer detects that the device is stationary, the device activates the first IR sensor and then activates the second IR sensor when the first IR sensor receives heat emitted by the person.

The electronic device may further include a processor communicatively linked to the IR sensor. The processor may be configured to receive the signal generated by the IR sensor and detect the presence of the person based on the received signal.

The processor may be further configured to initiate a notification if the presence of the person is detected.

The processor may be further configured to determine a distance between the person and the electronic device based on the received signal. In an embodiment, the processor may adjust a notification volume based on the determined distance. In another embodiment, the processor may change a type of notification based on the determined distance.

The processor may be further configured to carry out a function in response to the generated signal. The function may be selected from the group consisting of answering a call, dismissing a call, silencing a ringer, sending a call to voicemail, turning on a screen, waking up the electronic device, viewing the time, viewing new messages, scrolling a screen, scrolling through photos, panning a map, magnifying a view, switching audio mode, dismissing alert, silencing ringer, forwarding call to voice mail, setting audio level, steering audio toward user location, steering camera toward user location, turning on camera for user confirmation, authentication, or detection, and altering device functionality based on distance between user and device.

In another embodiment, an electronic device includes a housing, a first IR sensor, and a second IR sensor. The housing includes an outer surface having an opening formed thereon. The first IR sensor is disposed in the housing and adjacent to the opening. The second IR sensor is also disposed in the housing and adjacent to the opening. The second sensor has a smaller target area than the first IR sensor. The first IR sensor has an unobstructed path and line of sight through the opening to outside of the housing. The second IR sensor has an unobstructed path and line of sight through the opening to outside of the housing. The first IR sensor is configured to receive heat emitted by a person from outside of the housing via the opening and generate a first signal in response thereto. The second IR sensor is configured to receive heat emitted by the person from outside of the housing via the opening and generate a second signal in response thereto.

Each of the first IR sensor and the second IR sensor may be a thermopile sensor or a pyroelectric sensor.

The electronic device may further include a processor communicatively linked to the first IR sensor and the second IR sensor. The processor may be configured to receive the first signal and the second signal, detect the presence of the person based on the first signal, and detect the proximity of the person based on the second signal.

Each of the first IR sensor and the second IR sensor may be a thermopile sensor or a pyroelectric sensor.

In yet another embodiment, an electronic device includes a housing and an IR sensor. The housing includes an outer surface having an opening formed thereon. The IR sensor is disposed in the housing and adjacent to the opening, and the IR sensor has an unobstructed path and line of sight through the opening of the housing. The IR sensor receives heat emitted by a person from outside of the housing via the opening and generates a signal in response thereto. Based on the generated signal, the device detects the presence of the person.

If the device detects the presence of the person, the device may initiate a notification. The device may initiate the notification by displaying a notification on a display unit of the device, emitting a notification sound from the device, or vibrating the device.

Based on the generated signal, the device may further determine a distance between the person and the device.

In an embodiment, the device may adjust a notification volume based on the determined distance between the person and the device. The device may control the adjusted notification volume so that it does not exceed an initial notification volume.

In another embodiment, the device may change a type of notification based on the determined distance between the person and the device.

In still another embodiment, the device may repeat the initiated notification based on the determined distance between the person and the device.

In response to the generated signal, the device may further carry out a function. The function may be selected from the group consisting of answering a call, dismissing a call, silencing a ringer, sending a call to voicemail, turning on a screen, waking up the electronic device, viewing the time, scrolling a screen, scrolling through photos, panning a map, magnifying a view, switching audio mode, setting audio level, steering audio toward user location, steering camera toward user location, and altering device functionality based on distance between user and device.

Figure 1:
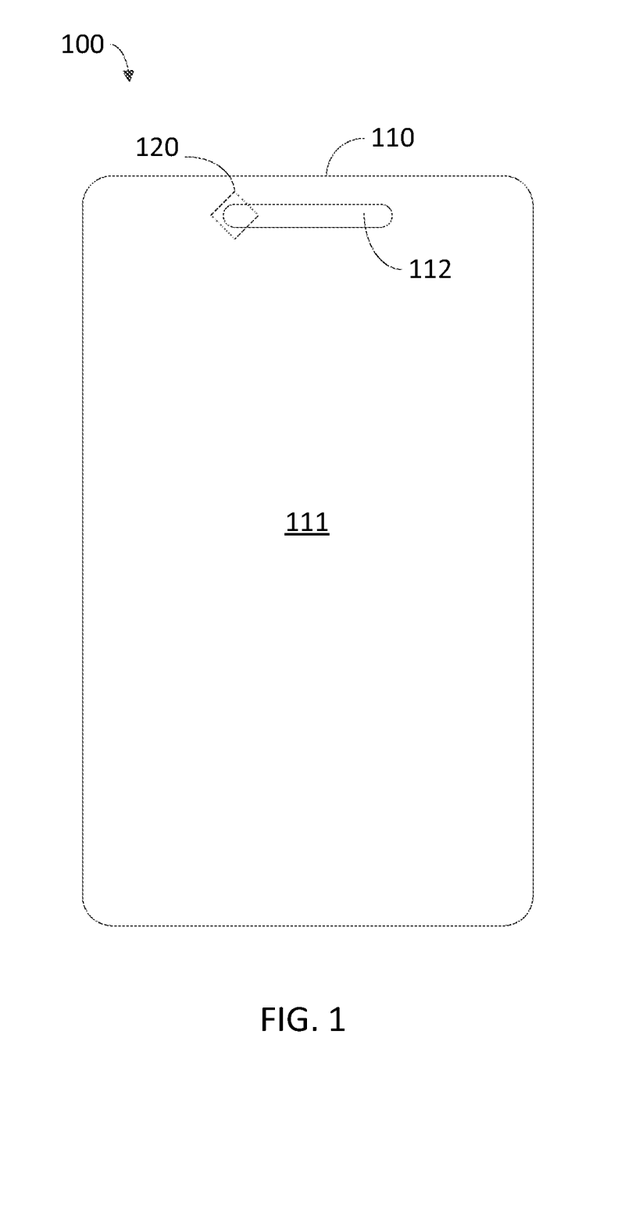
FIG. 1 is a top view of an electronic device, which is depicted as a mobile device in the drawing, according to an embodiment.

FIG. 1 is a top view of an electronic device 100, which is depicted as a mobile device in the drawing, according to an embodiment. The electronic device 100 includes a housing 110 and an IR sensor 120. The housing 110 includes an outer surface 111 having an opening 112 formed thereon. The IR sensor 120 is disposed in the housing 110 and adjacent to the opening 112. The IR sensor 120 has an unobstructed path and line of sight through the opening 112 to outside of the housing 110. The IR sensor 120 is configured to receive heat emitted by a person from outside of the housing 110 via the opening 112 and generate a signal in response thereto.

In the present embodiment, the IR sensor 120 is an IR receiver, and the presence detection system does not include an IR transmitter. Here, the IR transmitter is a person near the device 100, who may emit body heat or IR signal having a wavelength of about 10 micrometers. To detect the heat emitted by the person, the IR sensor 120 may be a passive heat sensor (e.g., a thermopile sensor), or a heat motion sensor (e.g., a pyroelectric sensor), or other heat sensors known in the art. In an embodiment, the IR sensor 120 may be a thermopile sensor configured to detect emitted heat having a wavelength that ranges between about 5 to about 100 micrometers. In a preferred embodiment, the IR sensor 120 is a thermopile sensor configured to detect emitted heat having a wavelength that ranges between about 5 to about 10 micrometers. Because the IR sensor 120 has an unobstructed path and line of sight through the opening 112 to outside of the housing 110, emitted heat or IR signals received by the IR sensor 120 are not attenuated by the top surface 111 (e.g., a cover glass) of the housing 110, thereby creating a more effective and efficient presence detection system.

The opening 112 is an opening typically used for a speaker (e.g., the audio output device 218 of FIG. 2) disposed in the housing 110. Although not shown, the speaker may be disposed within the housing 110 and directly below the opening 112 (i.e., the speaker has an unobstructed path and line of sight through the opening 112). As shown in FIG. 1, the IR sensor 120 is disposed toward an end of the opening 112. In other words, the IR sensor 120 shares the opening 112 with the speaker. In various embodiments, the IR sensor 120 may be disposed adjacent to the speaker.

In an embodiment, to prevent dirt or debris from entering the opening 112, the electronic device 100 may further include a mesh material (e.g., speaker mesh or speaker grille) or a thin polyethylene film that covers the opening 112. The mesh material may have one or more openings that are at least partially aligned with the opening 112 of the outer surface 111 of the housing 110. In other words, the IR sensor 120 has a substantially unobstructed path and line of sight through the mesh material and the opening 112, because the mesh material has very fine or small openings formed thereon. The mesh material may cause some attenuation in the reception of IR signals, but the openings in the mesh material are plenty and will allow a large portion of the IR signal to pass through.

In another embodiment, one or more optical element may be disposed between the IR sensor 120 and the opening 112 to better direct emitted heat or IR signals to the IR sensor 120. For instance, a lens may be disposed above the IR sensor 120 to control the field of view ("FOV") of the IR sensor 120. The FOV of the IR sensor 120 defines the detection coverage area or the detection target area of the IR sensor 120, which will be discussed later with respect to FIG. 3. The lens may break up the IR sensor 120's FOV into multiple FOVs, tilt the IR sensor 120's FOV in a different direction, or reshape the IR sensor 120's FOV making it wider, narrower, or biased in certain orientation. Accordingly, the lens may help direct the IR sensor 120's FOV to the target person. In various embodiments, other optical elements may be employed, e.g., prisms, prism arrays, combination of lenses and prism array, etc.

In still another embodiment, the IR sensor 120's FOV may be broken into two smaller FOVs. The first FOV may be used to detect the presence of a person, and the second FOV may be used to detect the proximity of the person. Thus, the first FOV may be larger than the second FOV. The second, smaller FOV allows the IR sensor 120 to detect the person when the person is proximate (or close) to the device 100 (e.g., the person's face is proximate to the device 100 when the person is on a call). If the IR sensor 120 detects that the person is proximate to the device 100, then device 100 may deactivate a touch screen of the device 100. In other words, the IR sensor 120 may be used to perform the IR proximity function.

The electronic device 100 may further include a processor (e.g., the processor 204 of FIG. 2) communicatively linked to the IR sensor 120. The processor may be configured to receive the signal generated by the IR sensor 120 and detect the presence of the person based on the received signal. If the presence of the person is detected, the processor may be further configured to initiate a notification or carry out other functions.

Figure 2:
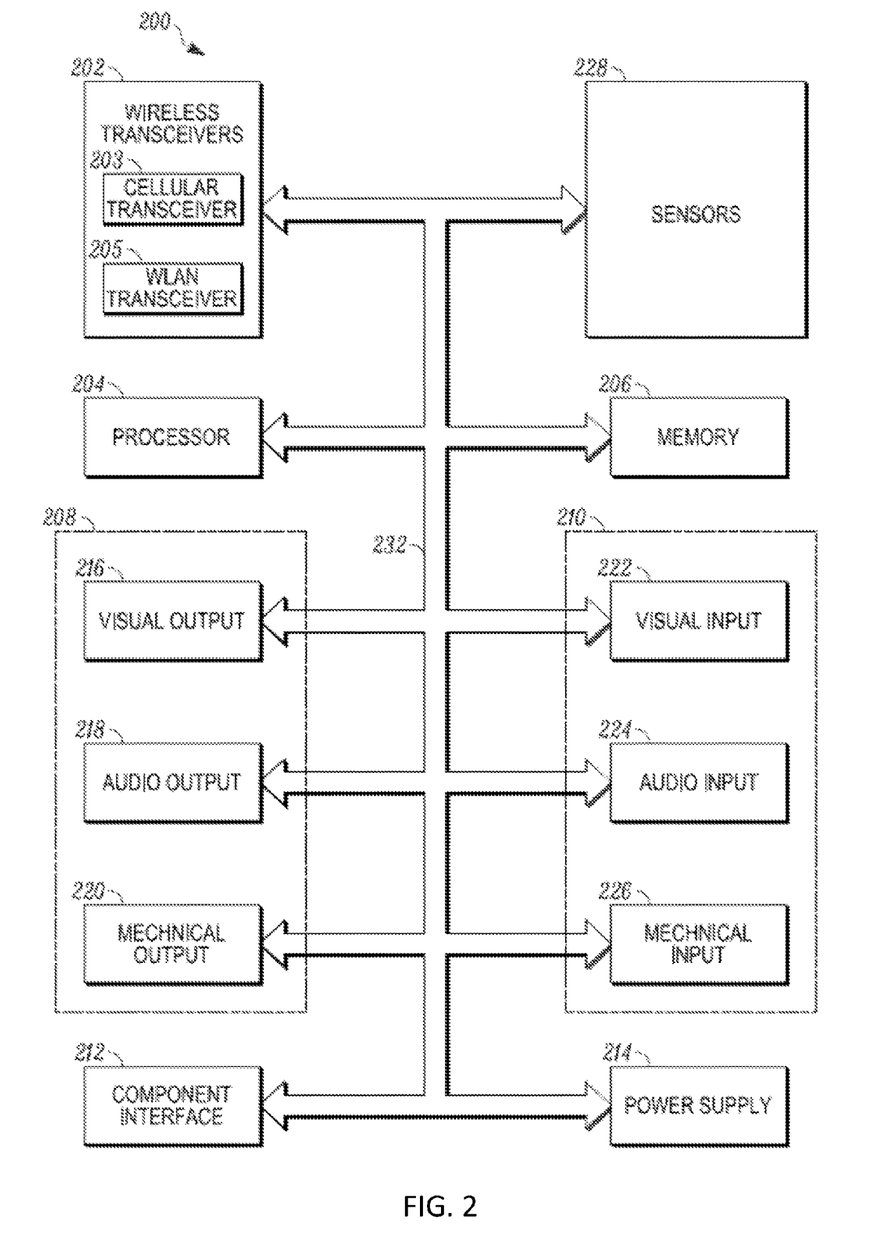
FIG. 2 shows example components of the electronic device of FIG. 1.

FIG. 2 shows example components of the electronic devices 100 of FIG. 1, in accordance with an embodiment of the disclosure. As shown in FIG. 2, the internal components 200 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 may also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment the device 100 has two of the wireless transceivers 202 (that is, the transceivers 203 and 205), the present disclosure is intended to encompass numerous embodiments in which any arbitrary number of wireless transceivers employing any arbitrary number of communication technologies are present. By virtue of the use of the wireless transceivers 202, the device 100 is capable of communicating with any of a variety of other devices or systems (not shown) including, for example, other mobile devices, web servers, cell towers, access points, other remote devices, etc. Depending upon the embodiment or circumstance, wireless communication between the device 100 and any arbitrary number of other devices or systems can be achieved.

Operation of the wireless transceivers 202 in conjunction with others of the internal components 200 of the device 100 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as a microphone (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228 as well as a sensor hub to manage one or more functions of the sensors. The sensors 228 may include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the device 100. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). In particular, in the present embodiment in which the device 100 includes a touch screen display, the touch screen display can be considered to constitute both a visual output device and a mechanical input device (by contrast, keys or buttons are merely mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the device 100 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), modules, and informational data. Each operating system includes executable code that controls basic functions of the device 100, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs can include, among other things, programming for enabling the device 100 to perform a process such as the process for presence detection and discussed further below. Finally, with respect to informational data, this is non-executable code or information that can be referenced and/or manipulated by an operating system or program for performing functions of the device 100.

Figure 3:
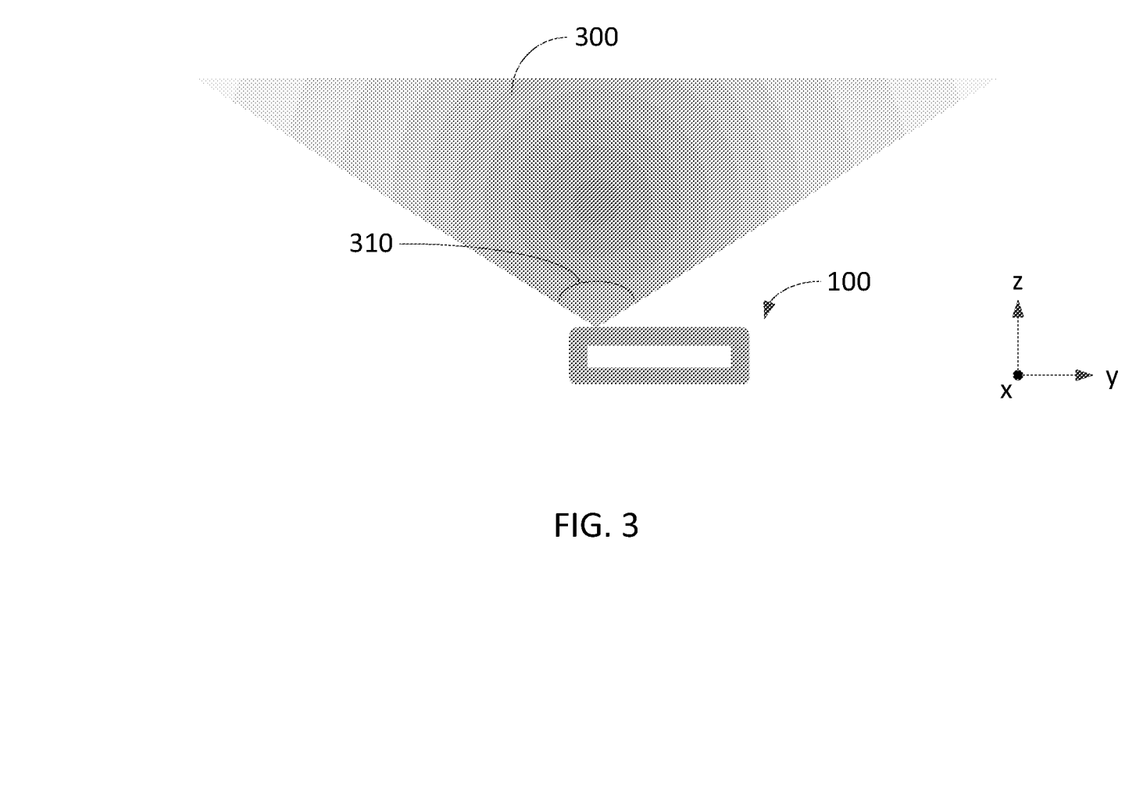
FIG. 3 is a side view of a detection coverage area of the electronic device of FIG. 1.

FIG. 3 shows a side view of a detection coverage area 300 of the electronic device 100 of FIG. 1. The detection coverage area 300 of the IR sensor 120 is shown in the y-z plane, which may be represented by an angle 310. In the present embodiment, the angle 310 may be about 120 degrees. In three-dimensional space, the detection coverage area 300 of the IR sensor 120 forms a substantially cone shape about the z-axis.

In other embodiments, if one or more optical elements are used to reshape the FOV of the IR sensor 120, the angle 310 may be altered (e.g., reduced) as the FOV becomes more targeted. In still other embodiments, the detection coverage area 300 may be tilted in other directions, i.e., away from the z-axis.

Figure 4:
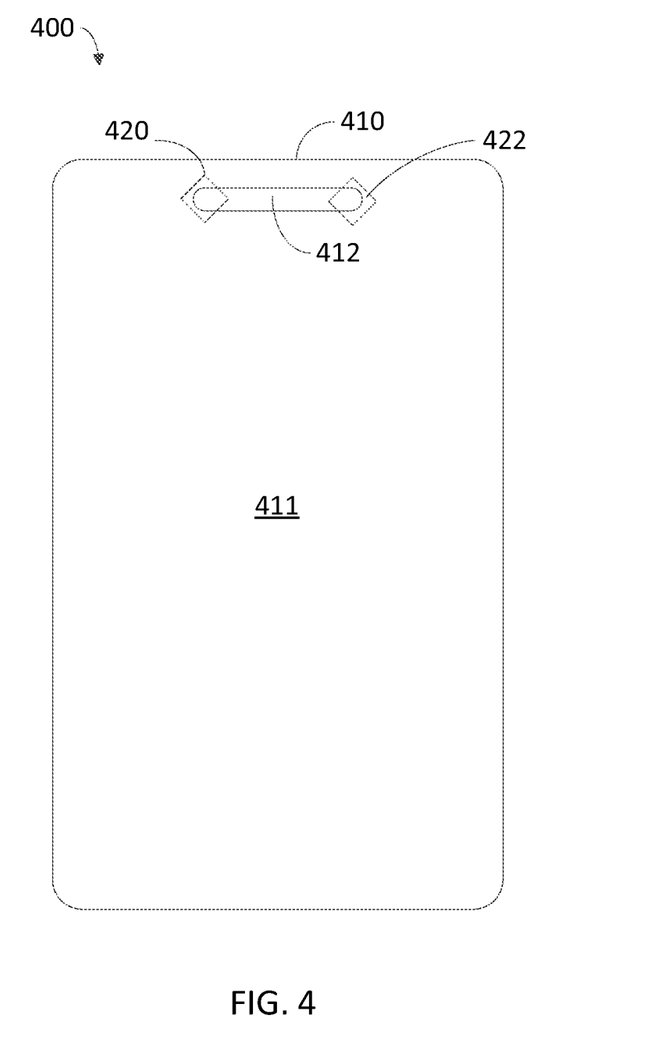
FIG. 4 is a top view of an electronic device, according to another embodiment.

FIG. 4 is a top view of an electronic device 400, according to another embodiment. The electronic device 400 includes a housing 410, a first IR sensor 420, and a second IR sensor 422. The housing 410 includes an outer surface 411 (e.g., cover glass) having an opening 412 (e.g., speaker opening) formed thereon. The first IR sensor 420 is disposed in the housing 410 and adjacent to the opening 412. The second IR sensor 422 is also disposed in the housing 410 and adjacent to the opening 412. The second sensor 422 has a smaller target area than the first IR sensor 420. The first IR sensor 420 has an unobstructed path and line of sight through the opening 412 to outside of the housing 410. The second IR sensor 422 has an unobstructed path and line of sight through the opening 412 to outside of the housing 410. The first IR sensor 420 is configured to receive heat emitted by a person from outside of the housing 410 via the opening 412 and generate a first signal in response thereto. The second IR sensor 422 is configured to receive heat emitted by the person from outside of the housing 410 via the opening 412 and generate a second signal in response thereto. In another embodiment, if a mesh material or a polyethylene film is disposed on the opening 412, the first IR sensor 420 and the second IR sensor 422 would have an substantially unobstructed path and line of sight through the opening 412, as the mesh material or the polyethylene film may cause some attenuation in the IR signals received.

Each of the first IR sensor 420 and the second IR sensor 422 may be a passive heat sensor (e.g., a thermopile sensor), a heat motion sensor (e.g., a pyroelectric sensor), or other heat sensors known in the art. In the present embodiment, as the second IR sensor 422 has a smaller target area than the first IR sensor 420, the first IR sensor 420 may have a gain that is different from the second IR sensor 422. The first IR sensor 420 and the second IR sensor 422 may have the same gain or different gain. In another embodiment, the gains of the first IR sensor 420 and the second IR sensor 422 may be controlled by the size or shape of the opening 412. In still other embodiments, the housing 410 may include two or more differently sized openings to guide to first IR sensor 420 or the second IR sensor 422, where these openings could have the same or different orientation or directionality. Optionally, one or more optical elements may be disposed between one or both of the first IR sensor 420 and the second IR sensor 422 to achieve the different sized target or coverage areas.

Since the first IR sensor 420 has a larger detection target area than the second IR sensor 422, the first IR sensor 420 may be used to detect the presence of a person, and the second IR sensor 422 may be used to detect the proximity of the person. Due to its smaller target area, the second IR sensor 422 detects the person when the person is proximate (or close) to the device 400 (e.g., the person's face is proximate to the device 400 when the person is on a call). If the second IR sensor 422 detects the person as being proximate to the device 400, then device 400 may deactivate its touch screen. In other words, the second IR sensor 422 of the device 400 may be used to perform the IR proximity function.

In an embodiment, when the person is walking with device, only the second IR sensor 422 (the shorter range IR sensor) is turned on or activated to perform the IR proximity function (e.g., disabling the touch screen during a phone call). The first IR sensor 420 (the longer range IR sensor) is turned off or deactivated to minimize false detection while the device is moving in the person's hand. In this case, an accelerometer or the second IR sensor 422 (or other touch sensors) in the device, but not the not the longer range IR sensor (e.g., first IR sensor 420) indicate presence.

In another embodiment, while device is stationary (e.g., placed on table), the second IR sensor 422 (the shorter range IR sensor) may be turned on only after the first IR sensor 420 (the longer range IR sensor) detects the person's presence. In other words, the first IR sensor 420 is turned on before the second IR sensor 422.

Although FIG. 4 illustrates that the first IR sensor 420 is disposed at one end of the opening 412 and the second IR sensor 422 is disposed at another end of the opening 412, the present disclosure is not limited thereto. The first IR sensor 420 and the second IR sensor 422 may be disposed anywhere below the opening 412, as long as each of the first IR sensor 420 and the second IR sensor 422 has an unobstructed path and line of sight (or a substantially unobstructed path and line of sight if a mesh material is used) through the opening 412 to outside of the housing 410.

The electronic device 400 may further include a processor communicatively linked to the first IR sensor 420 and the second IR sensor 422. The processor may be configured to receive the first signal generated by the first IR sensor 420 and the second signal generated by the second IR sensor 422. Based on the first signal, the processor may detect the presence of the person. Based on the second signal, the processor may detect the proximity of the person.

Figure 5:
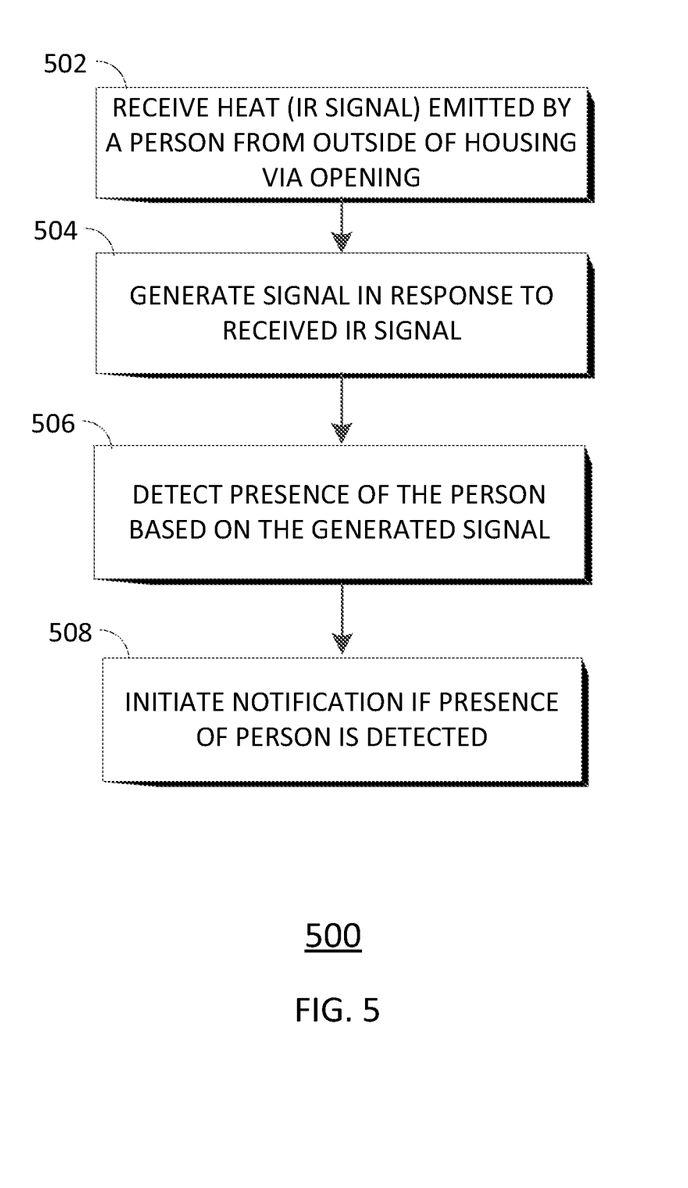
FIGS. 5-7 show steps that may be carried out according to various embodiments.

FIG. 5 illustrates a procedure 500 carried out by an electronic device (e.g., the electric device 100 of FIG. 1), according to an embodiment. As discussed above with respect to FIG. 1, the electronic device 100 includes the housing 110 and the IR sensor 120. The housing includes an outer surface 111 having an opening 120 formed thereon. The IR sensor 120 is disposed in the housing 110 and adjacent to the opening 112, and the IR sensor 120 has an unobstructed path and line of sight through the opening 112.

At step 502, the IR sensor 120 receives heat or IR signal emitted by a person from outside of the housing 110 via the opening 120. At step 504, the IR sensor 120 generates a signal in response to the received IR signal. Based on the generated signal, the device 100 detects the presence of the person at step 506. If any emitted heat or IR signal is received by the IR sensor 120, then the device 100 will recognize that the person is present.

At step 508, if the device 100 detects that the person is present, the device 100 initiates a notification. The device 100 may initiate the notification by displaying a notification on a display unit, emitting a notification sound, or vibrating the device 100.

In another embodiment, in response to the generated signal, the device 100 may carry out a function. The function may be selected from the group consisting of answering a call, dismissing a call, silencing a ringer, sending a call to voicemail, turning on a screen, waking up the electronic device, viewing the time, scrolling a screen, scrolling through photos, panning a map, magnifying a view, switching audio mode, setting audio level, steering audio toward user location, steering camera toward user location, and altering device functionality based on distance between user and device.

Figure 6:
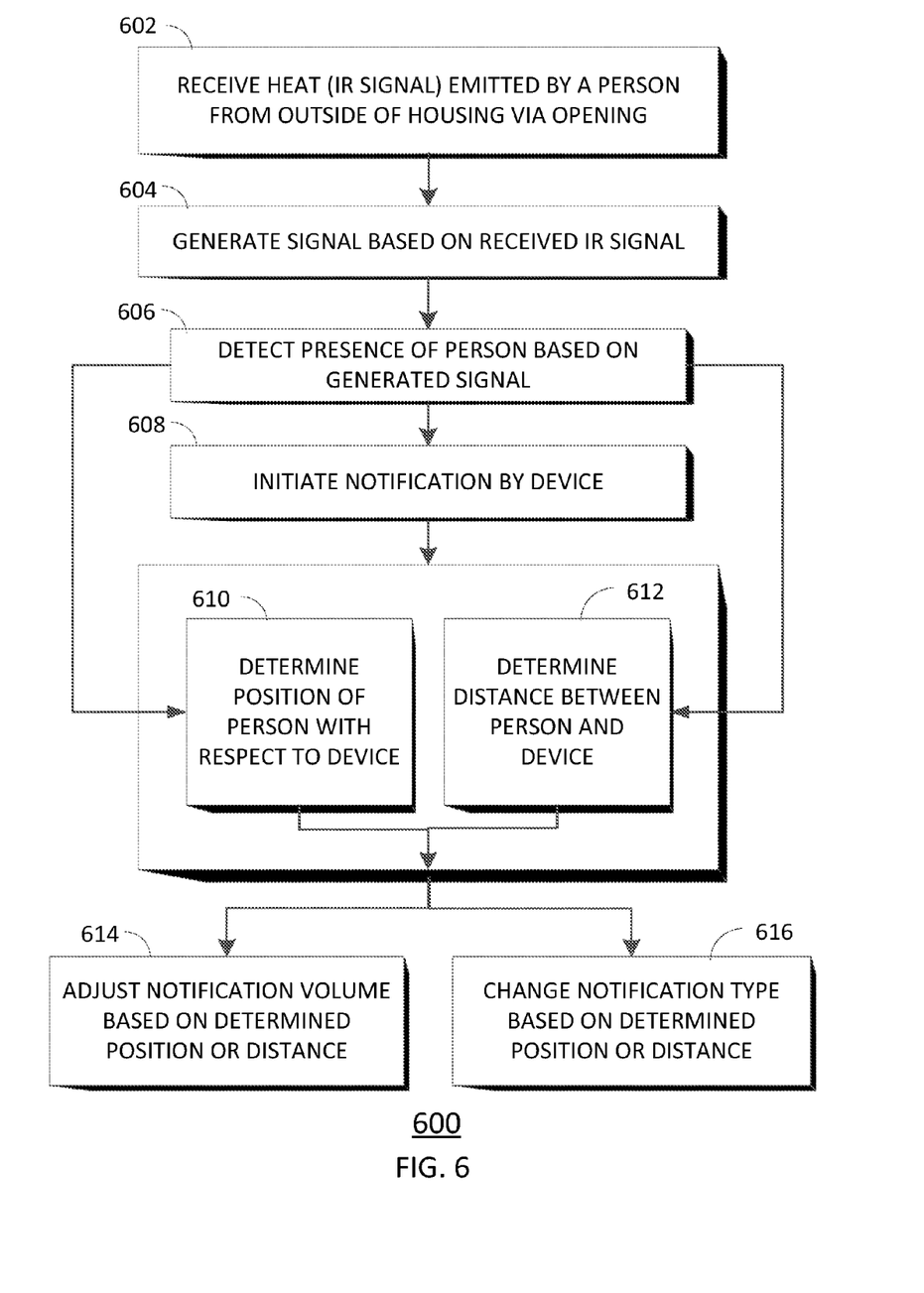

FIG. 6 illustrates a procedure 600 carried out by an electronic device (e.g., the electric device 100 of FIG. 1), according to another embodiment. At step 602, the IR sensor 120 receives heat or IR signal emitted by a person from outside of the housing 110 via the opening 120. At step 604, the IR sensor 120 generates a signal in response to the received IR signal. Based on the generated signal, the device 100 detects the presence of the person at step 606. If the device 100 detects that the person is present, the device 100 then initiates a notification at step 608.

When detecting the presence of the person at step 608, the device 100 may determine the position or distance of the person with respect to the device 100. At step 610, the device 100 may determine the position or direction of the person with respect to the device 100. Using the determined direction or position information, the device 100 may orient its display screen so that the screen is easily readable by the person (e.g., orient the display screen so text or other display elements are displayed right-side up from the person's viewing perspective). At step 612, the device 100 may determine the distance and/or a change in the distance between the person and the device 100.

If the initiated notification at step 608 is an emission of notification sound, then at step 614, based on the determined position or distance of the person with respect to the device 100, the device 100 may adjust the notification sound volume. As the person approaches the device 100 (i.e., the distance decreases), the device 100 may control the adjusted notification volume so that it does not exceed an initial notification volume.

Optionally, at step 616, based on the determined position or distance of the person with respect to the device 100, the device 100 may change a type of notification based on the determined position or distance between the person and the device 100. For instance, the device 100 may emit a notification sound when the person is first detected. When the person is within a predetermined distance of the device 100 (e.g., the person is close enough to the device to view the display screen), the device 100 may stop emitting the notification sound and change the notification to a display notification.

In other embodiments, the device 100 may repeat the initiated notification based on the determined distance between the person and the device.

Figure 7:
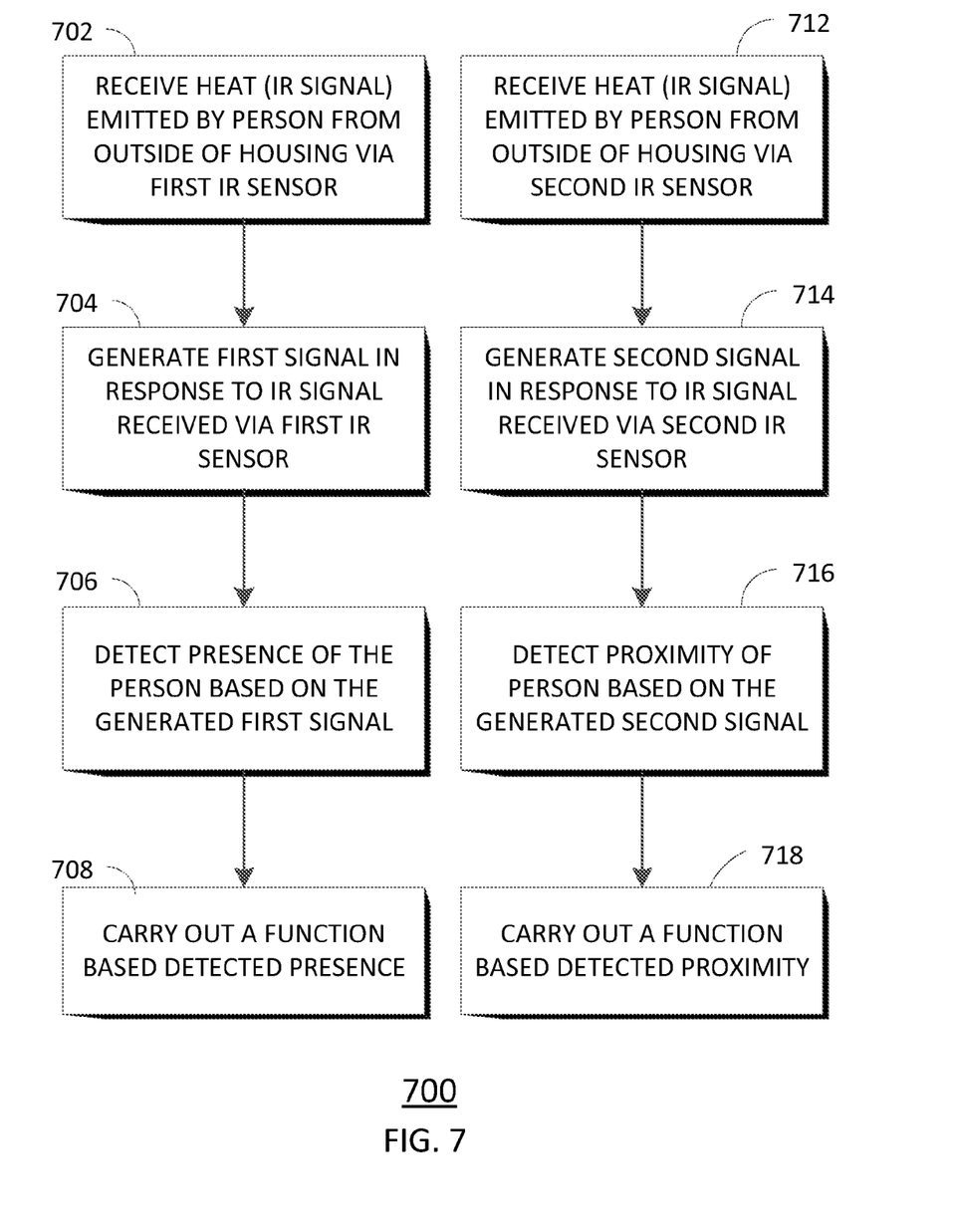

FIG. 7 illustrates a procedure 700 carried out by an electronic device (e.g., the electric device 400 of FIG. 4), according to still another embodiment. As discussed with respect to FIG. 4, the electronic device 400 includes the first IR sensor 420 and the second IR sensor 422. The first IR sensor 420 is disposed in the housing 410 and adjacent to the opening 412. The second IR sensor 422 is also disposed in the housing 410 and adjacent to the opening 412. The second IR sensor 422 has a smaller target area than the first IR sensor 420.

At step 702, the first IR sensor 420 receives heat or IR signal emitted by a person from outside of the housing 410 via the opening 412. The first IR sensor 420 then generates a first signal in response to the received IR signal at step 704. Based on the generated first signal, the device 400 detects the presence of the person at step 706. If the device 400 detects the presence of the person at step 706, the device 400 may carry out a function based on the detected presence at step 708.

In the present embodiment, because the second IR sensor 422 has a smaller target area than the first IR sensor 420, the second IR sensor 422 might not receive emitted heat or IR signal from the person until the person is proximate or close to the device 400. When a person is within the target area of the second IR sensor 422, at step 704, the second IR sensor 422 receives heat or IR signal emitted by the person from outside of the housing 410 via the opening 412. The second IR sensor 422 then generates a second signal in response to the received IR signal at step 714. Based on the generated second signal, the device 400 detects the proximity of the person at step 716. If the device 400 detects that the person is proximate at step 716, the device 400 may carry out a function based on the detected proximity at step 718 (e.g., deactivate a touch screen of the device 400). In other words, steps 712-718 describe the steps for performing an IR proximity function using the second IR sensor 422.

In another embodiment, steps 702-708 and steps 712-718 may be performed simultaneously, for instance, when a person is already proximate to the device 400. In other embodiments, the device 400 may perform steps 702-708 before steps 712-718, for instance, when a person is first approaching the device 400 and then becomes proximate to the device 400.

In yet another embodiment, the device may further include an accelerometer or other motion sensor to detect the orientation and movement of the device. The IR sensor may be a sensor of adjustable electrical gain. If the accelerometer detects that the device is being moved, the device switches the IR sensor to low electrical gain. If the accelerometer detects that the device is stationary, the device switches the IR sensor to high electrical gain. When the IR sensor has low electrical gain, it is used to perform the IR proximity function. When the IR sensor has high electrical gain, it is used to detect presence of a person.

If the accelerometer detects that the device is placed upside down (i.e., when the IR sensor is blocked), the device can turn off the IR sensor to reduce power consumption.

It can be seen from the foregoing that an electronic device and methods for detecting presence using an IR sensor have been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. An electronic device comprising:
   a housing including an outer surface having an opening formed thereon;
   an infrared ("IR") sensor disposed in the housing and adjacent to the opening, wherein the IR sensor has a line of sight through the opening to outside of the housing, the IR sensor being configured to:
      detect, via the opening and from the outside of the housing, heat; and
      generate a signal in response to detecting the heat; and
   a processor communicatively linked to the IR sensor and configured to:
      receive the signal generated by the IR sensor;
      determine, based on the signal generated by the IR sensor, a distance between a person and the electronic device;
      select, based on the distance, a type of notification to initiate in response to receiving the signal, wherein the type of notification is selected from a group consisting of a sound type of notification and a display type of notification; and
      initiate a notification that is of the type of notification selected based on the distance.

2. The electronic device of claim 1, wherein the IR sensor is a sensor selected from the group consisting of a thermopile sensor and a pyroelectric sensor.

3. The electronic device of claim 1, further comprising:
   a mesh material covering the opening, the mesh material having one or more openings that are at least partially aligned with the opening of the outer surface of the housing.

4. The electronic device of claim 1, wherein:
   the IR sensor is a sensor having adjustable gain;
   the electronic device further comprises an accelerometer configured to detect motion of the device;
   if the accelerometer detects that the device is moving, the device adjusts the gain of the IR sensor to a low gain; and
   if the accelerometer detects that the device is stationary, the device adjusts the gain of the IR sensor to a high gain.

5. The electronic device of claim 1, wherein the processor is further configured to:
   adjust a notification volume based on the determined distance in response to determining the type of notification is a sound type of notification.

6. The electronic device of claim 1, wherein the signal is a first signal and the processor is further configured to:
   receive a second signal generated by the IR sensor in response to detecting heat;
   determine a change in the distance between the person and the electronic device based on the first received signal and the second received signal; and
   change the type of notification based on the change in the determined distance.

7. The electronic device of claim 1, where in the processor is further configured to carry out a function in response to the generated signal.

8. The electronic device of claim 7, wherein the function is selected from the group consisting of answering a call, dismissing a call, silencing a ringer, sending a call to voicemail, turning on a screen, waking up the electronic device, viewing the time, viewing new messages, scrolling a screen, scrolling through photos, panning a map, magnifying a view, switching audio mode, dismissing alert, silencing ringer, forwarding call to voice mail, setting audio level, steering audio toward the person's location, steering camera toward the person's location, turning on camera for user confirmation, authentication, or detection, and altering device functionality based on distance between the person and the device.

9. The electronic device of claim 1, wherein the processor is configured to determine the type of notification based on the distance by at least:
   determining that the type of notification is a display notification rather than a sound notification if the distance is less than or equal to a predetermined distance threshold; and
   determining that the type of notification is a sound notification rather than the display notification if the distance is greater than the predetermined distance threshold.

10. The electronic device of claim 1, wherein the signal is a first signal and the processor is further configured to:
    receive a second signal generated by the IR sensor in response to detecting heat;
    determine a change in the distance between the person and the electronic device based on the first received signal and the second received signal; and
    stop the notification if the change in the distance is greater than a predetermined distance threshold.

11. A method comprising:
receiving, by a processor of an electronic device, a signal generated by an infrared ("IR") sensor of the electronic device, wherein:
the IR sensor is disposed in a housing of the electronic device and adjacent to an opening formed on an outer surface of the housing;
the IR sensor has a line of sight through the opening to outside of the housing; and
the signal is generated by the IR sensor in response to the IR sensor detecting heat via the opening and from the outside of the housing;
determining, by the processor, based on the signal generated by the IR sensor, a distance between a person and the electronic device;
selecting, by the processor, based on the distance, a type of notification to initiate in response to receiving the signal, wherein the type of notification is selected from a group consisting of a sound type of notification and a display type of notification; and
initiating, by the processor, a notification that is of the type of notification selected based on the distance.

12. The method of claim 11, wherein the initiating of the notification comprises at least one of displaying a notification on a display unit of the device, emitting a notification sound from the device, and vibrating the device.

13. The method of claim 11, further comprising:
adjusting a notification volume based on the determined distance in response to determining the type of notification is a sound type of notification.

14. The method of claim 13, wherein the adjusted notification volume does not exceed an initial notification volume.

15. The method of claim 11, wherein the signal is a first signal, the method further comprising:
receiving, by the processor, a second signal generated by the infrared sensor of the electronic device;
determining a change in the distance between the person and the electronic device based on the first received signal and the second received signal; and
changing the type of notification based on the change in the determined distance.

16. The method of claim 11, further comprising:
repeating the initiated notification based on the determined distance between the person and the device.

17. The method of claim 11, further comprising:
carrying out a function in response to the generated signal.

18. The method of claim 17, wherein the function is selected from the group consisting of answering a call, dismissing a call, silencing a ringer, sending a call to voicemail, turning on a screen, waking up the electronic device, viewing the time, viewing new messages, scrolling a screen, scrolling through photos, panning a map, magnifying a view, switching audio mode, dismissing alert, silencing ringer, forwarding call to voice mail, setting audio level, steering audio toward the person's location, steering camera toward the person's location, turning on camera for user confirmation, authentication, or detection, and altering device functionality based on distance between the person and the device.

19. The method of claim 11, wherein the IR sensor is a sensor selected from the group consisting of a thermopile sensor and a pyroelectric sensor.

20. The method of claim 11, wherein the electronic device comprises a mesh material covering the opening, the mesh material having one or more openings that are at least partially aligned with the opening of the outer surface of the housing.

21. The method of claim 11, wherein determining the type of notification based on the distance comprises:
determining, by the processor, that the type of notification is a display notification rather than a sound notification if the distance is less than or equal to a predetermined distance threshold; and
determining, by the processor, that the type of notification is a sound notification rather than the display notification if the distance is greater than the predetermined distance threshold.

22. The method of claim 11, wherein the signal is a first signal, the method further comprising:
receiving, by the processor, a second signal generated by the IR sensor of the electronic device in response to the IR sensor detecting heat via the opening;
determining, by the processor, a change in the distance between the person and the electronic device based on the first received signal and the second received signal; and
stopping, by the processor, the notification if the change in the distance is greater than a predetermined distance threshold.

23. An electronic device comprising:
a housing including an outer surface having an opening formed thereon;
an infrared ("IR") sensor disposed in the housing and adjacent to the opening, wherein the IR sensor has a first field of view with a first line of sight through the opening to outside of the housing and a second field of view with a second line of sight through the opening to outside of the housing, the IR sensor being configured to:
detect, through the opening, via the first field of view or the second field of view, heat from the outside of the housing; and
generate either a first signal in response to detecting the heat via the first field of view or a second signal in response to detecting the heat via the second field of view; and
a processor communicatively linked to the IR sensor and configured to:
initiate a first type of notification to in response to receiving the first signal generated by the IR sensor; and
initiate a second type of notification in response to receiving the second signal generated by the IR sensor, wherein the first and second type of notifications are different types of notifications and selected from a group consisting of a sound type of notification and a display type of notification.

24. The electronic device of claim 23, wherein the processor is further configured to:
after initiating the first type of notification in response to receiving the first signal generated by the IR sensor, receiving the second signal generated by the IR sensor;
responsive to receiving the second signal generated by the IR sensor, determining a change in distance between the person and the electronic device; and
stop the first type of notification if the change in the distance is greater than a predetermined distance threshold.

* * * * *